US006942386B2

(12) United States Patent
Weissflog

(10) Patent No.: US 6,942,386 B2
(45) Date of Patent: Sep. 13, 2005

(54) ROLLER BEARING FOR LINEAR MOVEMENTS

(75) Inventor: Dietmar Weissflog, Rheda-Wiedenbrück (DE)

(73) Assignee: Timken GmbH, Halle/Westfalen (DE)

( * ) Notice: Subject to any disclaimer, the term of this patent is extended or adjusted under 35 U.S.C. 154(b) by 63 days.

(21) Appl. No.: 10/752,842

(22) Filed: Jan. 7, 2004

(65) Prior Publication Data

US 2004/0197037 A1 Oct. 7, 2004

(30) Foreign Application Priority Data

Jan. 14, 2003 (DE) .......................................... 103 01 082

(51) Int. Cl.⁷ .............................................. F16C 29/04
(52) U.S. Cl. ............................................... 384/47; 55/54
(58) Field of Search ............................. 384/47, 54, 55, 384/50, 53

(56) References Cited

U.S. PATENT DOCUMENTS 3,012,421 A    12/1961  Cull
5,517,957 A    5/1996   Wagner et al.
6,343,993 B1   2/2002   Duval et al.
6,474,868 B2   11/2002  Geyer et al.

FOREIGN PATENT DOCUMENTS

| DE | 1 267 479  | 5/1968  |
| DE | 41 19 819  | 12/1992 |
| DE | 195 11 188 | 11/1998 |
| DE | 199 19 449 | 11/1999 |
| EP | 1 070 865  | 1/2001  |
| EP | 1 106 851  | 6/2001  |
| FR | 2795785    | 1/2001  |
| GB | 959828     | 6/1964  |

Primary Examiner—Lenard A. Footland
(74) Attorney, Agent, or Firm—Michael Best & Friedrich LLP

(57) ABSTRACT

A roller bearing for linear movements has two guide members arranged coaxially relative to each other between which there are provided races for roller members extending in the longitudinal direction. The roller members are biased in radial direction by at least one elastic element. The races for the roller members are shaped as guide surfaces directly at the two guide members, and the elastic element is provided radially offset with regard to the guide surfaces and acts by means of webs only indirectly onto these surfaces, by being subjected to a radial clamping force of a further annular element.

12 Claims, 2 Drawing Sheets

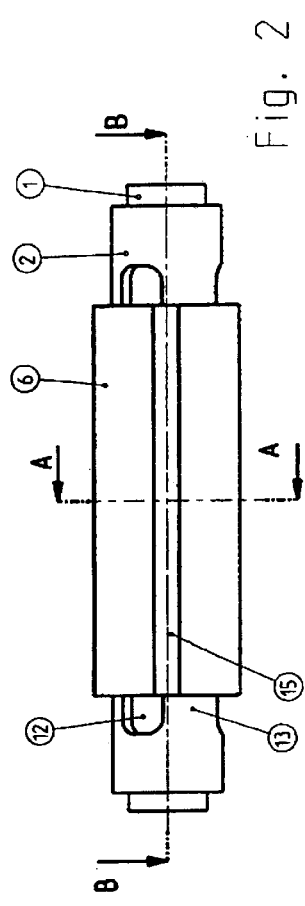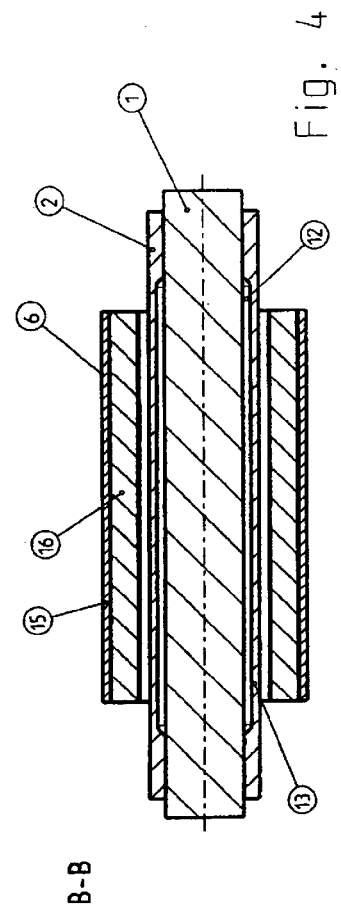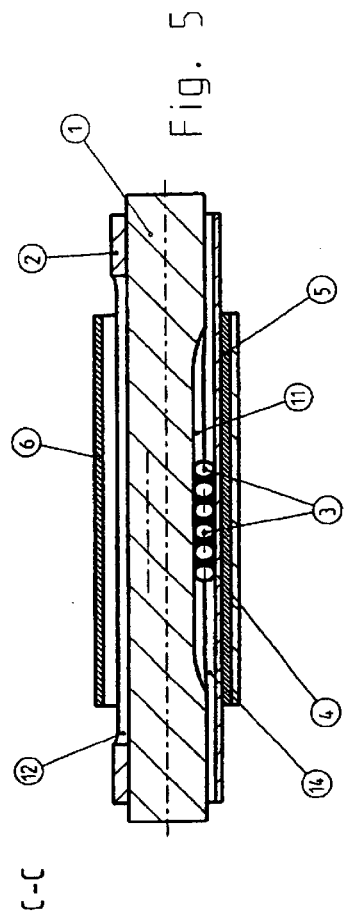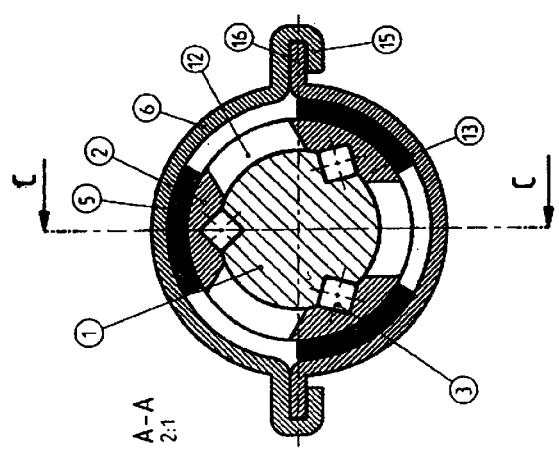

ROLLER BEARING FOR LINEAR MOVEMENTS

BACKGROUND

The invention relates to a roller bearing for linear movements.

Linear roller bearings of this and similar kinds are being employed in many fields of machinery and of automotive vehicle technology. By such roller bearings, constructional parts that are slideable relative to each other in longitudinal direction can be mounted against each other like bearings. In shaft arrangements the parts of which are slideable relative to each other telescopically in longitudinal direction, such a bearing must additionally transfer the torques applied to the shaft. Such telescopic shafts with variable length are used for example as steering shafts of steering columns in automotive vehicles. Thereby the position of a steering wheel in the vehicle can be adapted to the individual requirements of the operator. Since additionally the steering shaft transfers the steering torque from the steering wheel to the steering gear, the parts of the steering shaft must additionally be coupled with each other in a manner fixed against rotation. By means of one or more linear roller bearings arranged between the two parts of the shaft the axial sliding forces can be kept low and relatively constant along the entire sliding area.

FR 2 795 785 A1 discloses a similar arrangement wherein directly between at least one of the races of the two guide members and the roller members a plurality of individual elastic elements or spring means is arranged.

EP 1 070 865 A2 discloses a linear roller bearing for transmitting torques which is not provided with roller members arranged behind each other in a linear manner, but with ball rings provided between an inner and an outer profile element in a cage, wherein roller members movable in a first guide path are pre-biased by means of a spring metal sheet. The ball rings have load zones and zones free of load between the profile elements. Due to this arrangement with ball rings, the linear roller bearing is designed in a very expensive manner.

In EP 1 106 851 A1, the elastic element or spring means provided therein serves above all the purpose to balance manufacturing tolerances within a certain limit. For this purpose the spring means is arranged either between at least one race plate and a recess receiving this plate in a guide member formed as a sleeve or between a race plate and a corresponding recess in the guide member being formed as a guide rod. By the spring means, the roller members are pressed at least in radial direction into their respective positions or they are pre-biased in radial direction, but partially also biased in circumferential direction.

SUMMARY

This is a linear roller bearing for transferring torques about its longitudinal central axis, wherein an outer elongate guide member at least partially encloses a corresponding inner guide member. The inner guide member and the outer guide member are arranged movable relative to each other in longitudinal direction. At both guide members, races are formed extending in the longitudinal direction of the guide members and in which there are provided roller members. In this manner a transfer of torque is possible between the guide members from inside to outside or vice versa. By providing an elastic element or spring means biasing the roller members in radial direction the torque transfer is possible substantially free of backlash or play.

With regard thereto the invention is based on the problem to design the linear roller bearing free of backlash or play and in a most simple manner as regards construction.

By providing the races for the roller members directly at the two guide members and by the arrangement of the elastic element radially offset therefrom, which element thus only indirectly acts on the guide surfaces and on the roller members, according to the invention, there results an arrangement which functions free of backlash or play as well as with a telescopic axial sliding movement of the guide members relative to each other as well as above all in radial and in circumferential direction. Thereby the constructional design is comparatively simple. The arrangement of the elastic element is possible radially outside as well as also radially inside of the guide surfaces cooperating with each other by means of the intermediate roller members.

In an advantageous manner according to at least one embodiment, the elastic element is provided between one of the guide members and an annular element surrounding this. This annular element can be provided outside of as well as also inside of the associate guide member. By this ring element a defined clamping force is applied onto the roller members between the two guide members by means of the material of the elastic element storing energy. Due to this pre-biasing, thus, the system is free of play or backlash, and torques can be transmitted about the longitudinal axis in both rotational directions. Thus, there is a linear guiding system without play in which the two guide members are relatively slideable telescopically against each other.

In an at least one embodiment, the two guide members are designed as a guide rod and a guide sleeve, whereby the guide rod extends through the guide sleeve. This is, for example, particularly suitable for automotive steering shafts.

Further details and advantages of the invention result from the patent claims as well as from the following description of an exemplary embodiment in connection with the drawing.

BRIEF DESCRIPTION OF THE DRAWINGS

FIG. 2 is a schematic side view of the assembled parts of the roller bearing.

FIG. 3 is an axial cross section according to the line A—A of FIG. 2.

FIG. 4 is a longitudinal section according to the line B—B of FIG. 2.

FIG. 5 is an axial cross section according to the line C—C of FIG. 3.

DETAILED DESCRIPTION OF THE PREFERRED EMBODIMENT

Figure 1:
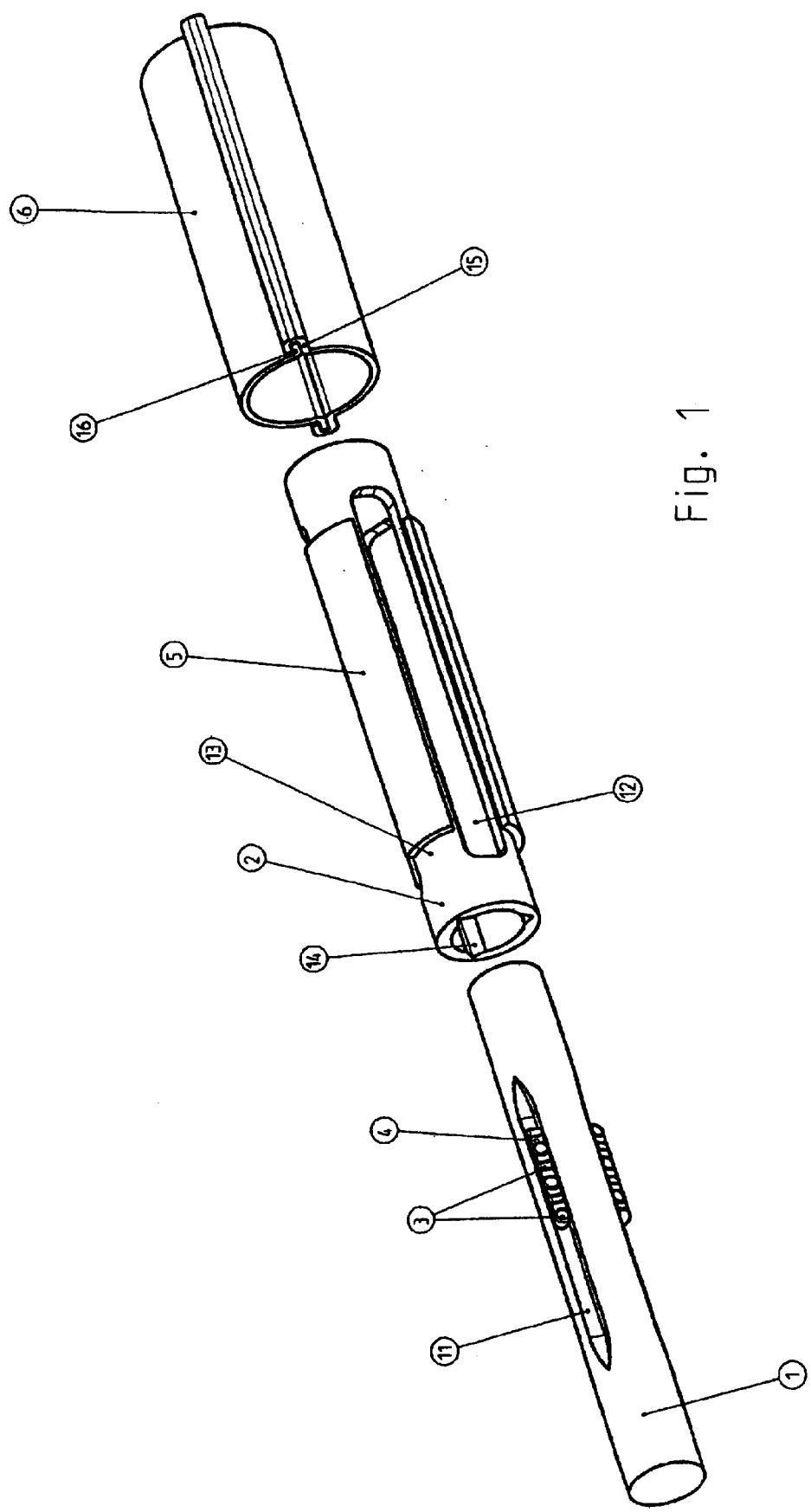
FIG. 1 is a schematic illustration extended in longitudinal direction of the roller bearing linear guiding system according to the invention.

The linear roller bearing at first has a first guide member 1 in the form of a guide rod. This guide rod 1 is surrounded at its outside by a second guide member 2 in the form of a guide sleeve 2. Between the guide rod 1 and the guide sleeve 2 there are provided roller members 3 arranged in longitudinal direction behind each other. The roller members 3 are running in V-shaped grooves 11 formed at the outer side of the guide rod 1, and in V-shaped grooves 14 formed at the inner side of the guide sleeve 2.

When the grooves 11 of the guide rod 1 and the grooves 14 of the guide sleeve 2 are radially aligned with each other, there results between these two parts a substantially rectangular hollow space. Within this space there are provided the roller members 3 which are designed as cylinder rollers. The diameter thereof is minimally greater than their length.

Adjacent cylinder rollers 3 are offset against each other by 90 degrees and inserted into this hollow space. Between these crosswise arranged roller members or cylinder rollers 3 there are provided intermediate pieces 4 guiding the roller members 3 and maintaining them in a certain distance from each other in longitudinal direction. By this crosswise arrangement of the roller members or cylinder rollers 3 it is possible to transmit a torque around the longitudinal axis of the roller bearing, depending on the requirement, in a left hand manner or a right hand manner and also from the inside to the outside or vice versa. A linear telescopical sliding movement of the guide rod 1 relative to the guide sleeve 2 is thereby possible in both axial directions at any time.

The guide sleeve 2 in the longitudinal direction of its circumference has recesses 12 in its material between which there are provided webs 13. Thereby these webs are elastic due to a spring action when they are subjected to radial forces. The V-shaped grooves 14 of the guide sleeve 2 are provided at the inner side of the webs 13.

Outside of the guide sleeve 2 in the area of its webs 13 an elastic and energy storing element 5 is put on. This element is lying as a segment in each of the radial force lines of the roller members 3. If three rows of roller members 3 and thus three rows of grooves 11 and 14 are used with equal angular distances at the circumference of the guide rod 1 and at the inner side of the guide sleeve 2, conveniently three corresponding elastic elements 5 are thus used covering the three webs 13 more or less.

These elastic elements 5 at their outer side are surrounded by a further annular element 6 formed as a clamping member for holding the elastic elements 5. This annular element 6 can for example be a clamp, a slotted sleeve, a two-part sleeve or the like. In the illustrated embodiment it is a closed sleeve 6 consisting of two half-circular cup parts being held together by means of a bracket-like extension 15 at one of the cup parts, which extension overlaps an extension 16 matching therewith at the other cup part. The extension 15 for example can be bent over or curled over the extension 16.

By the annular element 6 a defined clamping force is radially applied in a biasing manner by means of the energy storing elastic element 5 onto the roller members 3 between the central shaft or guide rod 1 and the surrounding guide sleeve 2. Thus, the entire system of the roller bearing is free of backlash or play.

In an alternative manner, the arrangement can also be made such that the central shaft or guide rod 1 is hollow and provided with recesses and webs corresponding to the recesses 12 and the webs 13 of the guide sleeve 2. The guide sleeve 2, then, can be designed, as illustrated, with recesses and webs 13, or the guide sleeve 2 can be shaped as a hollow cylinder with full walls. If the guide rod 1 is hollow and provided with corresponding recesses and webs, the elastic elements 5 can be arranged at the inner side of the hollow guide rod 1 and held there and pre-biased by a ring element corresponding to the annular element 6. Such a design and arrangement of the roller bearing shall also be covered by the scope of protection of the patent claims.

In the illustrated embodiment, the guide rod 1 and the guide sleeve 2 have a circular cross section. However, it is also possible to provide for these constructional parts other cross sections complementary to each other, for example triangular cross sections, particularly equal-sided triangles. Generally speaking the roller bearing arrangement according to the invention can also be designed with other cross sections, for example with square, rectangular or oval cross sections, as long as only the cross sections of the inner guide rod 1 and the outer guide sleeve 2 match with each other in a complementary manner and the roller members 3 are arranged in corresponding guide races between these structural parts. The inner or outer annular element 6 supplying the radial clamping force or pre-bias then has a correspondingly matching cross section.

In any case, there is provided a roller bearing system in which a linear adjustment (length adjustment) is possible without backlash or play, and a torque can be transmitted in both radial directions and in both rotary directions about the longitudinal axis without backlash or play.

What is claimed is:

1. Roller bearing for linear movements comprising:
   two elongate guide members arranged coaxially and relatively slideable to each other;
   a plurality of races for roller members provided between the guide members and extending in a longitudinal direction thereof; and
   at least one elastic element biasing the roller members in a radial direction,
   wherein the races for the roller members are formed as guide surfaces directly at the two guide members and the elastic element is arranged radially offset with regard to the guide surfaces and acts on the guide surfaces only indirectly.

2. Roller bearing according to claim 1 wherein the elastic element is provided between one of the guide members and an annular element surrounding this guide member.

3. Roller bearing according to claim 2 wherein the annular element is formed as a clamping member for holding the elastic element.

4. Roller bearing according to claim 1 wherein the guide members are formed as a guide rod and a guide sleeve, whereby the guide rod extends through the guide sleeve.

5. Roller bearing according to claim 1 wherein one of the guide members is provided in its longitudinal direction with recesses and webs arranged therebetween, and the elastic element is provided outside of the webs.

6. Roller bearing according claim 5 wherein in one of the guide members guide grooves for receiving the roller members are formed in the webs.

7. Roller bearing according to claim 1 wherein the guide surfaces are formed by axial grooves for receiving the roller members.

8. Roller bearing according to claim 7 wherein the guide grooves are formed in a V-shaped manner and the roller members are cylinder rollers.

9. Roller bearing according to claim 8 wherein the cylinder rollers have a diameter slightly greater than their length.

10. Roller bearing according to claim 9 wherein adjacent cylinder rollers are offset by 90 degrees relative to each other.

11. Roller bearing according to claim 1 wherein intermediate pieces are provided between adjacent roller members.

12. Roller bearing according to any of the preceding claims wherein the guide members have circular cross section.

* * * * *